Figure 1:
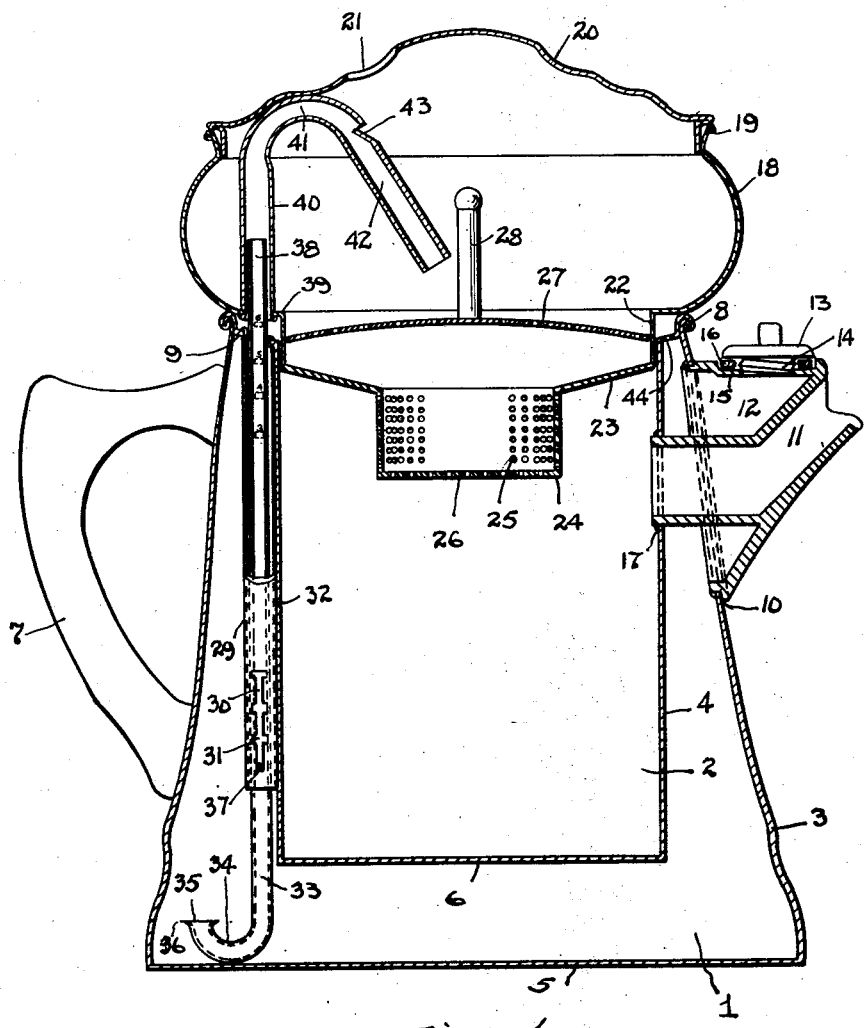

March 27, 1934.  S. A. HAINES  1,952,752
BEVERAGE BREWING DEVICE
Original Filed Oct. 12, 1929  2 Sheets-Sheet 1

INVENTOR.
Stacey A. Haines
BY
Fay, Oberlin & Fay
ATTORNEYS

March 27, 1934. S. A. HAINES 1,952,752
BEVERAGE BREWING DEVICE
Original Filed Oct. 12, 1929 2 Sheets-Sheet 2

INVENTOR.
Stacey A. Haines
BY
Fay, Oberlin & Fay
ATTORNEYS.

Patented Mar. 27, 1934

1,952,752

UNITED STATES PATENT OFFICE 1,952,752

BEVERAGE BREWING DEVICE

Stacey A. Haines, Chicago, Ill., assignor of one-half to Harold F. Spencer, Kansas City, Mo.

Application October 12, 1929, Serial No. 399,186
Renewed August 8, 1932

11 Claims. (Cl. 53—3)

This invention, as indicated, relates to beverage brewing devices and has specific reference to devices in which coffee, tea or like substances is brewed for beverage purposes, and has for an object to provide a means for the brewing of such beverages which shall have improvements in the quality thereof over such beverages as they are now made. A further object of this invention is to provide a means whereby a given quantity of beverage can be brewed by the manipulation of a simple adjusting means which will make the desired quantity and no more and no less. Another object of my invention is to provide a means whereby an alarm is sounded after the brewing process has been completed. Another object of my invention is to provide a novel means for the introduction of the liquid to such brewing device and also for withdrawing therefrom the brewed beverage.

Other objects of my invention will appear as the description proceeds.

In the description of my invention which is to follow, I prefer to refer to my invention as a means for the making of coffee. It is to be understood, however, that the device is adaptable to brewing other materials, such as tea, et cetera.

In the construction of the commonly used coffee pot or percolator which is in universal use, not only in the United States, but also other countries, the water from which the coffee is made is heated and upon being heated passes through a vertical tube and is discharged upon the coffee and allowed to filter downwardly therethrough, carrying with it the desirable elements of the coffee as well as a considerable portion of the undesirable elements. In the common construction of percolators, the water which passes through the ground coffee begins to so pass therethrough within a relatively short time after heat is applied to the utensil. This means that for a considerable portion of the time the water which passes through the ground coffee is of a temperature lower than the boiling point. This necessitates passing the water through the ground coffee a number of times, such frequent passage having the undesirable features in that it subtracts from the ground coffee a number of its undesirable constituents.

The coffee bean, as is well known to those familiar with the art of coffee making, is composed in the main of caffa, which is an oil and which is the sole element in the coffee bean structure which should be used in the preparation of coffee which is free from harmful habit-forming drugs. The caffa oil, however, is entrapped in the coffee bean by a honeycomb structure, the chief constituents of which are tannic acid and caffeine, these two elements being the undesirables usually found in poorly made coffee. To properly extract the caffa oil from the coffee bean, it becomes necessary to grind such bean to a relative fineness in order to destroy the honeycomb structure retaining such oil. When hot water is passed through finely ground coffee, if such hot water is permitted to remain in contact with the ground coffee for too long a period of time, such hot water extracts from the ground coffee not only the desirable caffa oil, but also a considerable portion of the tannic acid and caffeine. Also, if the hot water is repeatedly passed through such ground coffee, as is necessary in the ordinary commonly termed percolator, wherein the water starts circulating before it reaches the boiling point, such coffee also contains a considerable amount of the harmful tannic acid and caffeine.

It is, therefore, essential in the construction of a coffee brewing device that boiling water only be passed through the ground coffee, that it be passed therethrough only once, and that it remain in contact with such ground coffee for only a definite period of time.

The coffee brewing device comprising my invention accomplishes all of the foregoing desirable ends and, in addition, presents many desirable mechanical features which will appear as the description proceeds.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

Figure 2:
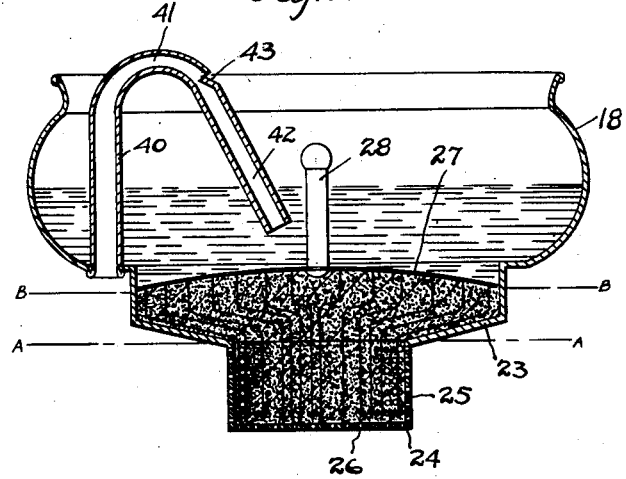
Figure 3:
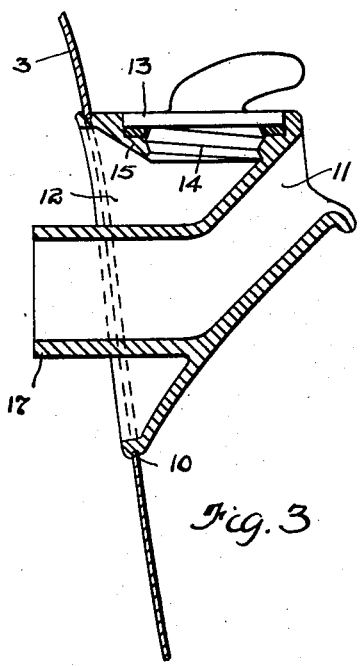
Figure 4:
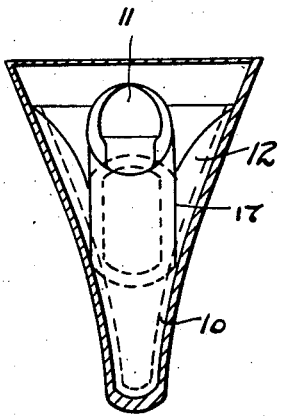

In said annexed drawings:

Fig. 1 is a part section, part elevation of a device embodying the principles of my invention; Fig. 2 is a sectional view of the ground coffee receptacle and its associated parts as shown in Fig. 1; and Figs. 3 and 4 are enlarged views of the improved spout shown on the device in Fig. 1.

Referring more specifically to the drawings and more especially to Fig. 1, the brewing device here shown consists of an outer or boiling chamber 1, an inner or infusion chamber 2, which are respectively formed by the substantially tubular walls 3 and 4 which have substantially flat bottoms 5 and 6, respectively. Attached to the outer wall 3 of the chamber 1 is a handle 7 of the common type, by which the device may be lifted or otherwise manipulated. The outer wall 3 of the chamber 1 has its upper edge 8 rolled or otherwise suitably reinforced, to which edge is secured an inwardly extending flange 9, the inwardly extending flange 9 being preferably the upper extension of the wall 4 of the infusion chamber 2. In this manner the infusion chamber 2 is suspended within the boiling chamber and forms a closure for the upper end of the outer wall 3, making the chamber 1 a closed chamber.

Attached to the outside wall 3 at 10 is an improved spout which has a passage 11 in communication with the infusion chamber 2 and a passage 12 in communication with the boiling chamber 1. The passage 12 is normally closed by means of a member 13 which has a ¼-turn thread 14 adapted to engage the similarly threaded wall 15 of the spout. Interposed between the closure member 13 and the wall 15 is a suitable gasket 16 which insures a perfect closure at this point. The juncture between the spout and the walls 3 and 4 at 10 and 17, respectively, may be effected by welding or other suitable means whereby a tight joint is effected.

Positioned upon and depending into the infusion chamber is a basket or head 18, which, at its upper end 19, is adapted to receive a suitable lid or closure member 20, the closure member 20 having formed therein an aperture 21 for the purposes hereinafter to be explained. The lower or coffee sustaining portion of the basket 18 has a cylindrical portion 22, a conical portion 23, and another cylindrical portion 24, which is suitably perforated, as at 25, and has a perforated bottom 26. Positioned within the coffee basket 18 and removable therewith is a suitable baffle plate 27 which has a projecting handle 28 extending upwardly therefrom, by which it is manipulated.

Depending from the inwardly directed flange 9 and rigidly secured thereto, is a tubular element 29, which has a longitudinal slot 30 and segmental circumferential slots 31 intersecting the longitudinal slot 30, at its lower end. The tubular member 29, for added rigidity of construction, may be attached longitudinally thereof at 32 to the wall 4 of the infusion chamber 2. Telescopically engaged by the tubular member 29 is a liquid transfer tube 33 which has its lower end 34 substantially J-shaped, the end 35 of which is outwardly flared as at 36. Rigidly attached to the element 33 is a pin 37 adapted for movement in the longitudinal slot 30 and adapted to be engaged by the segmental circumferential slots 31 to maintain the element 33 in any one of several vertical adjustments. The upper portion of the element 33 has indicating numerals thereon which are spaced similar to the slots 31. The upper end 38 of the element 33 extends above the flange 9 substantially for the purposes to be described. United with the wall of the coffee basket 18 at 39 is an upwardly extending element 40 adapted to telescopically engage the upper end 38 of the element 33 and has its medial portion 41 substantially U-shaped, as shown in Figs. 1 and 2, and has a downwardly extending portion 42, and between said portions 41 and 42 is formed an aperture 43. In the flange 9 which forms the closure for the upper end of the boiling chamber 1 is formed an aperture 44 for the purposes to be described.

In the operation of this device, that is when coffee or other like substance is to be prepared, the lid 20 is removed from the coffee basket, the baffle plate 27 is likewise removed from such basket and the required amount of ground coffee is placed within the bottom portion of the basket 18 and the baffle plate 27 and the lid 24 suitably replaced. The closure member 13 is then removed from the spout and the device grasped in the hand of the operator at the handle 7 and placed beneath a water faucet or other suitable source of supply and the pot so held in normal position is filled to the level of the closure member. The closure member is then properly secured in closed position and the device now contains a predetermined amount of water, depending upon its size. The device here shown is of the size in which six cups or thirty-six ounces of coffee is its maximum capacity.

If the operator desires to make only five cups of coffee the coffee basket is bodily removed from the device, the element 33 is raised until the pin 37 engages the lowermost of the circumferential slots 31, the member 33 is then supported in this position and the numeral five on the upper portion of the element 33 then registers with the upper surface of the flange 9, thereby insuring the operator that he or she has selected the proper position of the member 33 for the five cups of coffee which are desired to be made. The device is then placed over a suitable heating means and the water in the boiling chamber 1 gradually raised to the boiling temperature. The aperture 44 formed in the flange 9 permits the air and steam above the water level in the boiling chamber 1 to escape, thereby maintaining substantially atmospheric pressure within the boiling chamber 1 until the water therein reaches a hard boil and then the aperture 44 being of such size that it can no longer carry off the steam produced by the boiling water and maintain the pressure within the boiling chamber 1 at atmospheric pressure, the water thus being under pressure is forced into the open end 35 of the element 33, upwardly therethrough, and is discharged onto the baffle plate 27 through the downwardly extending member 42. It will thus be seen that the water in this device is first brought to a boiling temperature before any of such water is introduced to the ground coffee. The interval required to raise the water in the boiling chamber 1 to the boiling temperature is sufficient to permit the inside of the infusion chamber to become entirely heated and the ground coffee in the basket is also thoroughly heated before water is introduced thereto. This preheating of the ground coffee in the coffee basket, before the introduction of water thereto, starts the flow of the caffa oil in such ground coffee and thereby further insures the full transfer of all such oil from the coffee to the water as it passes therethrough.

When the five cups of water have passed over to the infusion chamber through the member 33, the end 35 of such member will lie in the water level of the boiling chamber 1. The end 35, therefore, no longer receives boiling water, but steam instead, and this steam passing upwardly through the element 33 into the portion 41 of such element strikes the aperture 43, which is in the form of a whistle slot, thereby sounding an alarm notifying the operator that the process has been completed. The end 35 of the element 33 is outwardly flared, as at 36, this flare keeping any water from passing into the element 33 after steam has once started therethrough.

At the instant the transfer of the water from the boiling chamber to the coffee basket has been completed, the water level in such coffee basket will be substantially as shown in Fig. 2, that is the lower end of the member 42 will be below such water level, which provides a cushion for the steam in such member, and the whistle, therefore, is in the form of a canary warble. After the lapse of a sufficient interval of time, during which the water in the coffee basket has passed downwardly through the ground coffee, thereby exposing the lower end of the element 42, the cushion for the steam in such element now being air, a shrill whistle will result.

It will be seen that the low toned warble emitted by the alarm means at the instant the transfer of the water is completed, is sufficiently loud to notify the operator should he or she be in the same room in which the device is being operated. If this low warble is not heard by the operator, if the device is permitted to remain on the heating means, after a short interval, as before explained, the warble becomes a shrill whistle which notifies the operator at any reasonable distance.

The aperture 21 is formed in the lid 20 of the coffee basket 18 to reduce the pressure within such basket to substantially atmospheric pressure, thereby insuring the operation of the whistle which necessarily would be curtailed were the pressure in such coffee basket permitted to build up to approximately that within the element 33.

The illustration in Fig. 2 of the coffee basket 18 clearly shows its peculiar adaptability to the making of coffee in the manner hereinbefore described. It will be seen from the structure here illustrated that the lower portion of the basket below the plane designated by the line A—A is of sufficient depth so that the hot water passing downwardly through the coffee in this reduced end is in contact with such coffee for a predetermined length of time which is required to extract from the coffee only the desirable ingredients and is not in contact with the coffee long enough to withdraw therefrom any of the tannic acid or caffeine. If the coffee basket which contains the coffee were made in the form of a vertical compartment, the ground coffee contained in the bottom of such compartment would be subject to the hot water for too long a period and consequently some of the harmful ingredients would be withdrawn therefrom. The construction of the coffee basket embodying the principle of my invention has an enlarged cross sectional area above the lower reduced end, the two portions of the basket connected by means of a conical element 23. The coffee contained in the basket 18 as illustrated in Fig. 2, which fills such basket to the plane indicated by the line B—B, is the amount required for approximately five cups of coffee in the particular size of coffee pot here used for purposes of illustration. The procedure for making any number of cups of coffee up to the maximum capacity of the utensil which for the purposes of illustration, in the drawings is shown to be six, is identical with the procedure just outlined, the only change being in the amount of ground coffee placed in the basket.

It will be seen that the water passing downwardly through the baffle plate 27 passes downwardly through the coffee which is laterally displaced over the conical surface, and, having passed downwardly therethrough a short distance, is deflected inwardly, thereby subjecting the coffee lying on this surface to a double action of the boiling water, thereby removing from such coffee the desirable ingredients.

This type of construction reduces the vertical distance which the water is required to pass through the coffee and therefore the period in which the water is in contact with the coffee in the lower portion of the receptacle is materially decreased to the point where a minimum of the harmful ingredients are extracted. The size of the apertures 24 and 25 is constant for all sizes of receptacles and is such that the flow of the water through the coffee is sufficiently restrained to properly carry on the brewing process.

Upon considering the construction as above described, it may be noted that the apparatus in its entirety comprises two separate units each chambered, the first mounted upon the second and removable from its mounted position, the second—(lower)—unit containing an upwardly open chamber which in the operation of the apparatus receives and contains the brewage or infusion produced from the material carried in a chamber of the first—(upper)—unit, which upper chamber in the mounted position of the first mentioned unit overhangs said chamber of the second unit, the second unit having an exterior handle and a pouring spout leading from the infusion chamber. And it will be noted that this construction of the apparatus in two members each complete in itself for being handled as a unit, adapts the apparatus for a very desirable mode of use, consisting in operating the apparatus in entirety for producing the brewed beverage, and when such beverage is produced and accumulated in the infusion chamber of the lower unit, removing the upper unit carrying the dregs of the substance from which the brewage has been produced, and leaving the lower unit in condition for serving the brewage by pouring. And in this connection it will be noted that the top openings of the two units are substantially equal in diameter, so that the cover, 20, shown in position covering the upper unit, may be used to cover the lower unit when the upper unit has been removed from the lower and the latter is to be used for serving the brewage.

The whistle shown as part of the water delivery tube also serves the purpose of suitably diffusing the water coming over through such delivery tube and prevents the water from being projected in a single stream on the surface of the baffle plate 27. The Figs. 3 and 4 are included to more fully illustrate the construction of the spout and to further bring out its novel features, which makes it particularly applicable to construction of the character herein described.

It will be understood that the spout may be connected to the device in a number of different arrangements and the method herein described of so connecting the spout to the utensil may be varied without in any way affecting the adaptability of the spout to the purposes for which it was designed.

No further description of my invention is deemed necessary for those acquainted with the art, since it is to be understood that the construction of the various details of the device may be altered and still retain the basic principles of my invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a brewing device, the combination of an inner chamber; an outer chamber; means associated with said outer chamber adapted for the introduction of the contents of such chamber thereto; means associated with said first named means and in communication with said inner chamber; and an aperture in said first named means for pouring from such inner chamber the contents thereof.

2. In a brewing device, the combination of an inner chamber, an outer chamber, a spout member comprising an inner and an outer flow passage having respectively encompassed and encompassing inner and outer wall parts, the outer wall part being joined to the outer chamber wall at an aperture in the latter, and the inner wall part being extended through said aperture and joined to the inner chamber at an aperture in the latter, said apertures in said chamber walls being near the upper ends of the chambers respectively, and a discharge opening of the outer spout passage being accessible opening upwardly at the upper side of the spout member, whereby it is adapted for access in filling the outer chamber with liquid.

3. In a device of the character described, the combination of an inner chamber; an outer chamber; a receptacle for the substance to be brewed; means for transferring the contents of one of such chambers to the other, said transfer being effected through the substance to be brewed in said receptacle; a whistle associated with said transfer; means having an open-ended depending portion extending toward the substance to be brewed.

4. In a device of the character described; the combination of boiling chamber; an infusion chamber; a receptacle for the substance to be brewed; means adapted to transfer a predetermined portion of the contents of said boiling chamber to said infusion chamber; alarm means for signaling the completion of such transfer; a cover for said infusion chamber and said receptacle; and an aperture in said cover adapted for maintaining the pressure surrounding said alarm means substantially the same as the pressure without such device.

5. In a device of the character described, the combination of a boiling chamber; an infusion chamber; adjustable means for effecting the transfer of a predetermined quantity of liquid from said boiling chamber to said infusion chamber, and alarm means for signalling the completion of such transfer, telescopically engaged by said adjustable means.

6. In a device of the character described, the combination of boiling chamber; an infusion chamber; a tubular member rigidly secured to the wall of one of such chambers, a fluid delivery member terminally provided with a rebent flared portion telescopically engaged by said tubular member and adapted to be coaxially adjustable therewith to effect the transfer of varying portions of the contents of said boiling chamber to said infusion chamber, and engageable means associated with said tubular member and said fluid delivery member for maintaining said adjustment.

7. In a device of the character described, the combination of a boiling chamber; an infusion chamber, a tubular supporting member secured to one of such chambers, said supporting member having longitudinal and transverse apertures formed therein; a fluid delivery means telescopically engaged by said supporting member; and means associated with said delivery means adapted to be engaged by said apertures to adjustably position said delivery means within said boiling chamber.

8. In combination with a utensil having a plurality of chambers, of means for transferring predetermined quantities of the contents of one of such chambers to another, said means including telescopically engaged tubes, one of which has a plurality of longitudinally spaced apertures adapted to be engaged by a projection of the other of such tubes.

9. In a device of the character described, the combination of a boiling chamber; an infusion chamber; means for transferring a portion of the contents of said boiling chamber to said infusion chamber; and a rebent end for said transferring means, said end having a flared mouth for the purposes described.

10. In a device of the character described, the combination of a boiling chamber; an infusion chamber; means for transferring the contents of said boiling chamber to said infusion chamber; and an aperture formed in said boiling chamber adapted to prevent the carrying on of said transfer until the contents of said boiling chamber has been caused to boil.

11. An apparatus for the purpose specified comprising a chambered element containing an outer boiling chamber and an inner infusion chamber non-communicatingly partitioned from each other, the infusion chamber having a pouring opening to atmosphere at the upper part, and the boiling chamber having exterior handling means for pouring, a second chambered element having at its bottom a receptacle for material to be treated for infusion and arranged at the upper part for receiving liquid to be led into contact with said material in said receptacle, said second element being formed and arranged for mounting on the first mentioned chambered element with its bottom partitioning the chamber of said second element from and overhanging the upper end of the boiling chamber at the extent of the latter outwardly from the infusion chamber, the top of the boiling chamber at said overhung part, and the bottom of said second chamber element at said overhanging part having registering openings for communication of said second chambered element with the boiling chamber of the first mentioned element, tubular connection extending fluid-tight in said aperture for flow communication from the boiling chamber with the chamber of the second element, said second chambered element being unitarily constructed for demounting bodily as an undivided unit comprising the receptacle for material and the water-receiving part and the tubular connection, from the first mentioned chambered element, whereby the latter is adapted for serving the infusion by pouring without embarrassingly protruding parts.

STACEY A. HAINES.